(12) United States Patent
Fett

(10) Patent No.: US 6,962,546 B1
(45) Date of Patent: Nov. 8, 2005

(54) LIMITED SLIP DIFFERENTIAL USING FLUID COUPLING

(75) Inventor: Gregory Allen Fett, Ft. Wayne, IN (US)

(73) Assignee: Torque Traction Technologies, Inc., Maumee, OH (US)

( * ) Notice: Subject to any disclaimer, the term of this patent is extended or adjusted under 35 U.S.C. 154(b) by 28 days.

(21) Appl. No.: 10/799,723

(22) Filed: Mar. 15, 2004

Related U.S. Application Data

(63) Continuation-in-part of application No. 10/215,086, filed on Aug. 9, 2002, now abandoned.

(51) Int. Cl.$^7$ .............................................. F16H 48/26
(52) U.S. Cl. ......................................... 475/85; 475/89
(58) Field of Search .................................... 475/85, 89

(56) References Cited

U.S. PATENT DOCUMENTS

| | | | |
|---|---|---|---|
| 3,211,022 A | 10/1965 | Anderson | |
| 4,458,559 A | 7/1984 | Croswhite et al. | |
| 4,836,051 A | 6/1989 | Guimbretie | |
| 4,869,129 A | 9/1989 | Hazebrook | |
| 5,158,507 A | 10/1992 | Guimbretiere | |
| 5,167,293 A | 12/1992 | Park et al. | |
| 5,310,382 A | 5/1994 | Guimbretiere | |

FOREIGN PATENT DOCUMENTS

| | | |
|---|---|---|
| JP | 61153042 A | 7/1986 |
| JP | 04025646 A | 1/1992 |

*Primary Examiner*—Dirk Wright
(74) *Attorney, Agent, or Firm*—Berenato, White & Stavish

(57) ABSTRACT

A fluid coupling employing a viscous fluid to produce a limited slip differential assembly. The fluid coupling is disposed within a differential casing along with a pair of side gears. The fluid coupling includes a first impeller provided with a first set of vanes and drivingly coupled to one of the side gears, a second impeller provided with a second set of vanes and drivingly coupled to the differential casing so that the first set of vanes is facing the second set of vanes, and a viscous fluid disposed between the first and second sets of vanes.

9 Claims, 3 Drawing Sheets

LIMITED SLIP DIFFERENTIAL USING FLUID COUPLING

CROSS-REFERENCE TO RELATED APPLICATION

This application is a continuation-in-part of application Ser. No. 10/215,086, filed Aug. 9, 2002, now abandoned.

BACKGROUND OF THE INVENTION

1. Field of the Invention

This invention relates generally to limited slip differentials in general, and, more particularly, to a differential assembly including a fluid coupling using a high viscosity fluid such as silicone oil to provide the differential assembly with a limited slip capability.

2. Description of Related Art

The prior art differentials comprise one input element and two output elements mounted so that they rotate about the same axis. The two output elements are connected, in one form or another, to propel shafts laterally and eventually leading to the main wheels of the vehicle. In another configuration of a differential, the two output elements are connected respectively to the input elements of two other differentials.

Typical fluid couplings transmit torque primarily in a single direction. By altering vane design, they can be made more bi-directional is necessary in order to control the effectiveness of the differential in both directions. Typically, fluid couplings are structurally comprised of elements as described in the SAE recommended practice. SAE J641.

Improvements have been sought in the operation of these differentials by combining them with locking or slip-limiting devices.

A first type of self-locking differential comprises at least one friction clutch interposed between two of the previously mentioned input and output elements. This clutch maybe controlled by a mobile element inside the differential, the position of which depends on the torque which passes in transit through this differential.

A second attempt to improve the operation of a differential consisted of associating it with a coupling device with plates and with a viscous fluid operating in shear. This arrangement is then interposed between two of the input and output elements of the differential. In this second case, it is the difference in rotation speed between the two elements between which the viscous coupler device is interposed that determines the braking efficiency of the viscous coupler.

These two types of device have disadvantages which result from the fact that in one case the clutch control in practice takes into account only the torque passing in transit through the differential and the magnitude of the difference in speeds between the output elements, while in the second case it takes into account only the difference in speeds between the elements between which the viscous coupler device is interposed. The result is that, in both cases, there are unchangeable and hence unsuitable characteristics of the variation in torque as a function of the speed difference. In addition, this arrangement is subject to lock-up, whereas a fluid coupling is not subject to the same lock-up.

These disadvantages manifest themselves particularly, for the first type of device, through difficulties with steering during parking maneuvers, or else through the creation of torque, transferred between wheels or between axles, which is large and whose direction can change abruptly, even though the ground only allows weak driving or braking torque, and for the second type through a certain deficiency in the use of antilock brake control systems.

Thus, as previously mentioned, the prior art discloses use of a generic viscous coupling device in a differential assembly. Such devices are not disposed between the side gear and differential assembly.

It is also known to have transmission devices comprising a viscous-fluid coupling. However, this viscous-fluid coupling has yet to be applied between the side gear and the differential assembly.

It is also known to have a viscous coupling assembly containing a front differential gear assembly. In this instance the viscous assembly includes a container housing a plurality of inner and outer plates. A drive gear is disposed between a central differential casing and the viscous coupling assembly.

It is highly desirable to provide a fluid coupling with a high viscosity silicone fluid to provide limited slip capability in an axle differential. The fluid coupling should be disposed between the side gear and the differential assembly.

SUMMARY OF THE INVENTION

The present invention is directed a differential having limited slip differential capability. The differential includes a differential casing, a pair of side gears oppositely situated in and rotatably supported by the differential casing, a pinion shaft arranged at right angle to the axis of the side gears and fixed to the differential casing at both ends thereof, a plurality of pinions rotatably mounted on the pinion shaft and adapted to mesh with the side gears, and a fluid coupling disposed between the side gear and the differential casing.

The fluid coupling includes a first impeller having a first set of vanes operably connected and located proximate the side gears, a second impeller having a second set of vanes located adjacent the first set of vanes and proximate the differential casing, and a viscous fluid disposed between the first set of vanes and the second set of vanes. The fluid coupling may be capable to transferring torque in two directions or primarily in one direction.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings.

DETAILED DESCRIPTION OF THE PRESENT INVENTION

Figure 1:
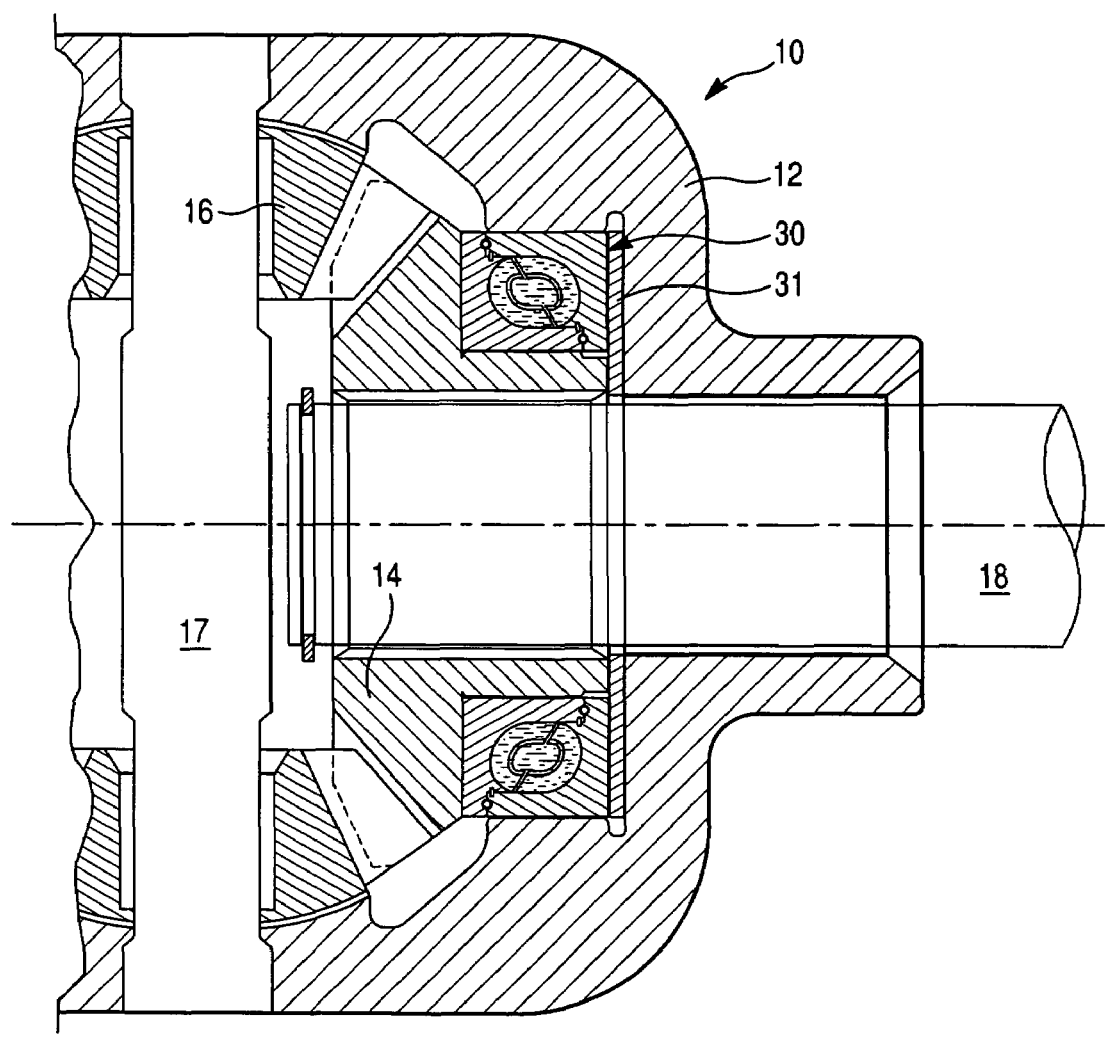
FIG. 1 is a sectional view of a differential assembly in accordance with a preferred embodiment of the invention.

Referring now to FIG. 1, reference numeral 10 designates a limited slip differential assembly in accordance with a preferred embodiment of the invention comprising a differential casing 12 housing a pair of side gears 14 and a plurality of pinions 16 designed to mesh with one another.

Both of the side gears 14 are rotatably supported by the differential casing 12 in such a manner that a spline 14a of each side gear 14 is inserted into each cylindrical portion 20 of the differential casing 12. Both of the pinions 16 are rotatably supported by a pinion shaft 17, both ends of which are fixed on the differential casing 12.

Figure 2:
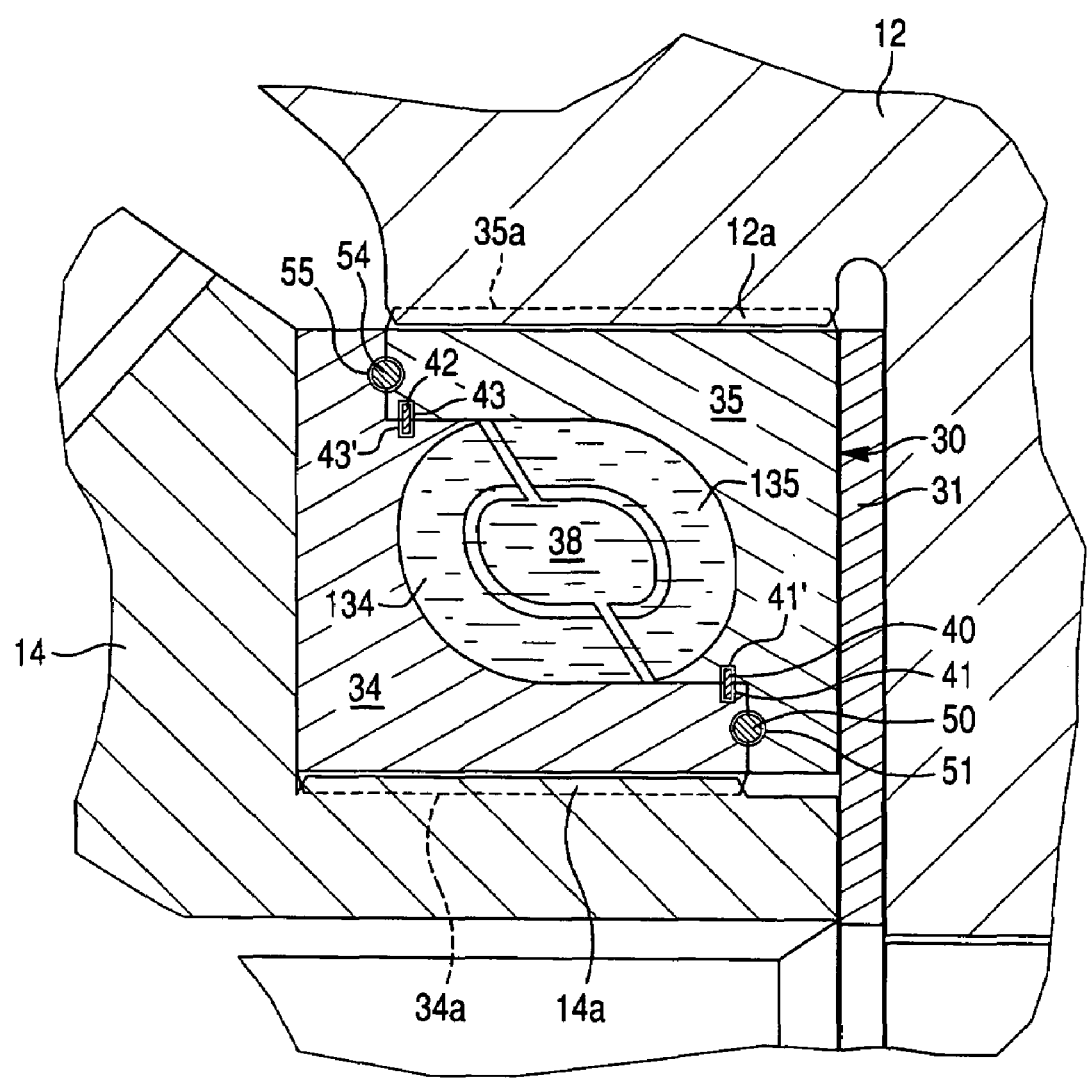
FIG. 2 is a partial sectional view of the differential assembly in accordance with a preferred embodiment of the invention showing a fluid coupling.

With reference to FIG. 2, a fluid coupling 30 offering limited slip capabilities is disposed within the differential casing 12 between the side gear 14 and the differential casing 12. A thrust washer 31 is disposed between the fluid coupling 30 and the differential casing 12. The fluid coupling 30 is of the type consisting of two opposite impellers: a first impeller 34 and a second impeller 35. The first impeller 34 is provided with a first set of vanes 134 (only one vane 134 is shown in FIG. 2) is in driving connection with side gear 14 via the splines 14a on the side gear 14, while the second impeller 35 provided with a second set of vanes 135 (only one vane 135 is shown in FIG. 2) is in driving connection with the splines 11a on the differential casing 12. The first impeller 34 has splines 34a and the second impeller 35 has splines 35a. The vanes 134 and 134 are immersed in a high viscous fluid 38, which may, for example, be a high viscosity silicone fluid. The vanes 134 and 134 may be manufactured of any appropriate material, such as metal (aluminum, steel, iron, etc.) or plastic.

Figure 3:
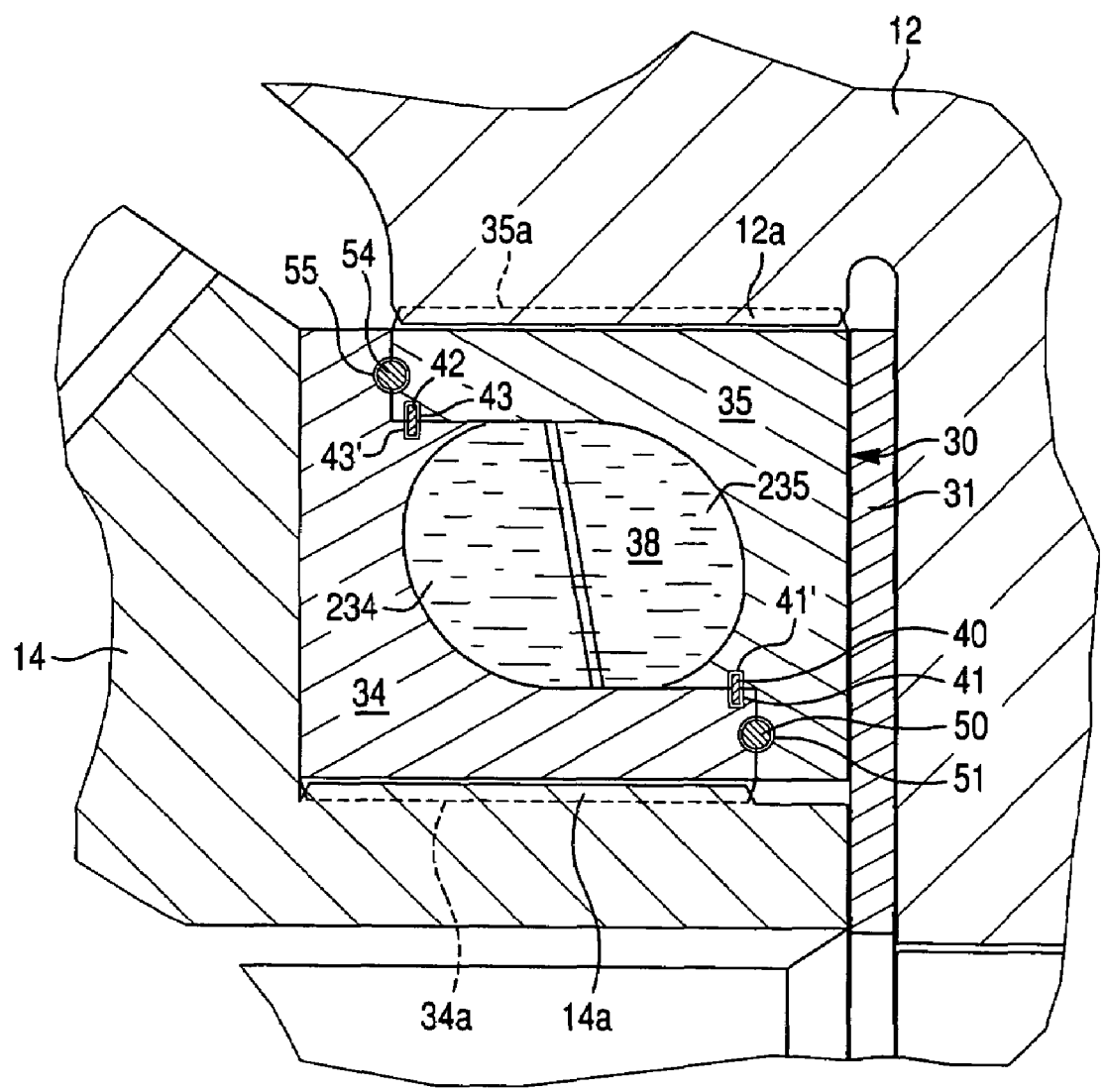
FIG. 3 is a partial sectional view of the differential assembly in accordance with a preferred embodiment of the invention showing the fluid coupling with alternative embodiment of vanes.

The fluid coupling 30 is shown in greater detail when viewing FIG. 2. As illustrated, the first set of vanes 134 is facing the second set of vanes 135. Preferably, as shown in FIG. 2, each of the vanes 134 of the first impeller 34 and the vanes 135 of the second impeller 35 has a substantially C-shaped configuration. Alternatively, as illustrated in FIG. 3, the first impeller 34 may have a first set of vanes 234 and the second impeller 35 may have a second set of vanes 235 both having substantially semi-circular configuration.

As further illustrated in FIG. 2, the first impeller 34 and the second impeller 35 are held together by an inner snap ring 40 and an outer snap ring 42. The inner snap ring 40 engages the first impeller 34 via a groove 41 in the first impeller 34 opposite of the side gear splines 14a of the side gear 14 and the second impeller 35 via a groove 41' in the second impeller 35. Similarly, the outer snap ring 42 fits securely into a groove 43 in the second impeller 35 opposite of the splines 12a on the differential casing 12 and a groove 43' in the first impeller 34, thus engaging both the first and second impellers 34 and 35. The placement of the fluid coupling 30 allows the torque generated in either forward or backward direction to be transferred and improve the efficiency of the differential assembly 10.

As previously stated, the high viscosity fluid 38 is disposed between the first set of vanes 134 of the first impeller 34 and the second set of vanes 135 of the second impeller 35. The high viscosity fluid is preferably made of a silicone base. It should be appreciated that while the preferred fluid employed is a silicone based fluid, those skilled in the art would recognize that other fluids that exhibit the properties necessary for the fluid coupling to transfer the drive torque may also be used. The fluid 38 fills a cavity between the first and second impellers 34 and 35.

In order to prevent the viscous fluid 38 from leaking or draining out of the fluid coupling 30, a set of seals is used. A first seal 50 is disposed in a cavity 51 formed between the first impeller 34 and the second impeller 35 proximate the splines 14a of the side gear 14 as shown in FIG. 2. Similarly, a second seal 54 is disposed in a cavity 55 formed between the first impeller 34 and the second impeller 35 proximate the splines 12a of the differential casing 12.

The fluid coupling 30 operates in the following manner. In the absence of engine torque, the fluid coupling 30 is only operated or controlled by the difference in the rotational speeds between the differential casing 12 and the output shaft 18 associated with the side gear 14.

Since the first impeller 34 and the second impeller 35 are disposed between the differential casing 12 and the side gear 14, and have a viscous fluid 38 therebetween, they mutually transmit the driving load through the viscous fluid 38 as a transferring agent. If the second impeller 35 have a different driving load from the first impeller 34, the difference of the driving loads generates a torque and the generated torque must be distributed forcefully to the low turning side in order to even out and mutually distribute the driving torque of the engine. This is accomplished by the viscous fluid 38 being forced from the set of vanes exhibiting a higher speed to the set of vanes with a lower speed. The torque is generated through a speed differential between the differential case 10 and the side gear 14. Therefore, the driving force of the engine is automatically distributed according to the load which exists on opposite wheels of a motor vehicle and due to the road conditions.

For example, when the load of the left wheel is larger than that of the right wheel or vise versa, the torque of the first impeller 34 is smaller than that of the second impeller 35. However, the fluid coupling 30 allows the torque to be distributed to the right wheel is decreased and simultaneously the torque to be distributed to the left wheel is increased. Therefore, the driving of the vehicle can be smoothly continued in accordance with the road conditions.

While the foregoing invention has been shown and described with reference to several preferred embodiments, it will be understood that various changes in form and detail may be made without departing from the spirit and scope of the present invention.

What is claimed is:

1. A differential assembly having a limited slip differential capability, said differential assembly comprising:
   a differential casing;
   a pair of side gears oppositely situated in and rotatably supported by said differential casing;
   a pinion shaft arranged at right angle to an axis of said side gears and fixed to said differential casing at both ends thereof;
   a plurality of pinions rotatably mounted on said pinion shaft and adapted to mesh with said side gears; and
   a fluid coupling disposed between one of said side gears and said differential casing,
   wherein said fluid coupling comprising:
      a first impeller provided with a first set of vanes and operably connected to one of said side gears;
      a second impeller provided with a second set of vanes and operably connected to said differential casing so that said first set of vanes is facing said second set of vanes; and
      a viscous fluid disposed between said first set of vanes and said second set of vanes, and wherein said fluid is forced from the set of vanes exhibiting a higher speed to the set of vanes with a lower speed.

2. The differential assembly according to claim 1, wherein said first impeller and said second impeller are held together with at least one snap ring.

3. The differential assembly according to claim 2, wherein said at least one snap ring engages a corresponding grooves formed within said first and said second impellers.

4. The differential assembly according to claim 1, wherein said first impeller is drivingly coupled to said one of said side gears.

5. The differential assembly according to claim 1, wherein said second impeller is drivingly coupled to said differential casing.

6. The differential assembly according to claim 1, wherein vanes of said first and second sets of vanes have substantially C-shaped configuration.

7. The differential assembly according to claim 1, wherein vanes of said first and second sets of vanes have semi-circular configuration.

8. The differential assembly according to claim 1, wherein said fluid coupling includes at least one seal disposed between said first impeller and said second impeller to contain said viscous fluid within said fluid coupling.

9. The differential assembly according to claim 8, wherein said at least one seal is disposed in a corresponding cavity between said first and second impellers, said cavity is defined by opposite complimentary grooves formed in said first and second impellers.

* * * * *